Patented June 27, 1944

2,352,468

UNITED STATES PATENT OFFICE 2,352,468

DRILLING FLUID

Thompson W. Burnam, Inglewood, Calif.

No Drawing. Application November 24, 1941,
Serial No. 420,266

2 Claims. (Cl. 252—8.5)

The present invention relates to a drilling fluid for use in the rotary method of drilling oil wells. In the rotary method of drilling oil wells it is customary to circulate a mud-laden fluid, called a drilling fluid, down the drilling pipe to the drilling bit where the mud fluid enters the well and returns to the surface of the well in the space between the well hole or well casing and drill pipe. This drilling fluid not only serves the purpose of conveying to the surface of the well the cuttings formed by the drilling tool, but the drilling fluid also serves the purpose of plastering or sealing off the formations from the well hole, and protects the walls of the well hole from caving in upon the drilling tools. Where it is necessary to drill through porous formations, considerable difficulty is frequently encountered in properly sealing off the formations from the well hole. Considerable quantities of the mud-laden fluid which are pumped down the well hole through the drilling string may fail to return to the surface of the well, and in place of returning to the surface of the well penetrate the porous formations through which the well is drilled.

It is a general object of the present invention to provide an improved mud-laden fluid for oil or gas wells characterized by the fact that said mud-laden fluid has superior plastering properties and is adapted for use in drilling through porous formations without substantial loss of the drilling fluid to said porous formations.

It is a further object of the present invention to provide a mud-laden drilling fluid for oil or gas wells characterized by the fact that the drilling fluid has superior texture and lubricating properties, such as will enable a smoother operation of the drill pipe in the well hole and permit a smoother operation of the pumping equipment employed for circulating the drilling fluid in the well hole.

It is a further object of the present invention to provide a mud-laden drilling fluid for oil or gas wells characterized by the property of superior operation where it is necessary to drill the well through gas formations.

The present invention is predicated on the discovery that the characteristics of a mud-laden fluid for oil and gas wells may be materially enhanced by the addition to the mud-laden fluid of a thermoplastic material. As an example of the advantages to be secured by means of the present invention, the following may be cited:

Where a well has been previously losing from 7 to 10 tons of mud per day due to the formation, and great difficulty was being experienced in properly plastering the walls of the well, there was added to the mud-laden fluid used in drilling said well thermoplastic materials in accordance with the present invention. Thereafter, the loss of mud fluid to the well substantially ceased and in the next twenty-one days of drilling less than 700 pounds of mud were consumed in the operations.

A further important property of the mud fluid of the present invention is its action in expelling gas. The particular well previously referred to was producing a considerable quantity of gas which was expelled but slowly from the mud as the mud passed through the sump. The result was that the pump handling the mud was to a substantial extent gas-locked so that difficulty was experienced in pumping the mud back down the well-hole. Moreover, danger was present to the drilling operations from the presence of such gas in the drilling fluid. By the addition to the drilling fluid of the thermoplastic material in accordance with the present invention, it has been discovered that the gas is expelled from the mud at a greatly accelerated rate, so that the mud in the sump adjoining the well-hole is in operation substantially free of gas.

The explanation for the improved properties of the mud-laden fluid of the present invention for plastering off formations from the well-hole is thought to reside in the fact that the thermoplastic material added to the mud-laden fluid possesses a tendency to readily permeate the sands of the well and coat the surfaces of the well with a thermoplastic material. Experiments have also indicated that these coatings of thermoplastic material undergo an expansion in the presence of oil well gases, which expansion of the coatings of thermoplastic material has the property of further driving the thermoplastic material firmly into the orifices and crevices of the formations surrounding the well, producing a firm shut-off from the well and holding the material in position until the thermoplastic agent sets.

The thermoplastic material in the drilling fluid at the same time increases the slimy character of mud, holds the earthy material from settling, and operates to expel from the mud any natural gas or oil derived from the well-hole.

Various thermoplastic materials may be used in forming the drilling fluid of the present invention. I have, for example, employed a thermoplastic material having the following formulae:

To 1 gallon of petroleum oil solvent, preferably high in aromatic content, there were added 16 ounces of Ethocel, a cellulose ether, resulting from the interaction of ethyl chloride with alkali cellulose. The cellulose ether constitutes the basic thermoplastic material employed. Other well-known solvents for cellulose ether might be substituted, such as coal tar hydrocarbons, or possibly alcohols. To retain the plastic properties of the material I generally prefer to add formaldehyde resins for the purpose of acting as plasticizers. For example, I prefer to include, along with the 16 ounces of ethyl cellulose, 2 ounces of the urea type of formaldehyde resins, such as the urea formaldehyde resins or melamine formaldehyde resins. I also preferably include 2 ounces of an alkyd resin product, consisting of a 55 or 60% solution, using xylol as a solvent, of an alkyd resin material. Such a composition forms an excellent thermoplastic material for combination with drilling fluid. Other resinous materials are sometimes combined with the above formulae and may be of value in further improving the character of film plastered upon the formation by the mud fluid. For example, I have found that the addition of small quantities of the phenolic types of resins may produce films of great improved adhesiveness or toughness.

The drilling fluid of the present invention may be formed by adding the thermoplastic materials to any well-known or preferred type of aqueous drilling fluid, such as the aqueous suspension of colloidal clay of the bentonite type, or aqueous suspensions of any colloidal clay carrying wetting materials, such as barytes. It is only necessary to add a very small quantity of the thermoplastic material to the drilling fluid. For example, I have secured satisfactory operations by adding from 0.05% to 0.1%.

While the particular mud-laden fluid herein described is well adapted to carry out the objects of the present invention, it is to be understood that the invention includes various modifications and is of the scope set forth in the appended claims.

I claim:

1. A mud-laden fluid for oil or gas wells, which comprises mainly an aqueous suspension of colloidal clay and from 0.05% to 0.1% of a cellulose ether of the water-insoluble type and a solvent of said cellulose ether.

2. A mud-laden fluid for oil or gas wells, which comprises an aqueous suspension of colloidal clay and from 0.05% to 0.1% cellulose ether of the water insoluble type and a formaldehyde resin as a plasticizing agent.

THOMPSON W. BURNAM.